United States Patent
Tamura

(10) Patent No.: US 11,482,826 B2
(45) Date of Patent: Oct. 25, 2022

(54) OPTICAL PROCESSING APPARATUS, OPTICAL PROCESSING METHOD, AND OPTICALLY-PROCESSED PRODUCT PRODUCTION METHOD

(71) Applicant: Ricoh Company, Ltd., Tokyo (JP)

(72) Inventor: Asato Tamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 967 days.

(21) Appl. No.: 16/202,192

(22) Filed: Nov. 28, 2018

(65) Prior Publication Data

US 2019/0221985 A1    Jul. 18, 2019

(30) Foreign Application Priority Data

Jan. 12, 2018    (JP) .............................. JP2018-003228

(51) Int. Cl.
| | |
|---|---|
| *B26D 5/20* | (2006.01) |
| *H01S 3/00* | (2006.01) |
| *H01S 3/08* | (2006.01) |
| *G02B 27/09* | (2006.01) |
| *H01S 3/134* | (2006.01) |

(52) U.S. Cl.
CPC ............ *H01S 3/0085* (2013.01); *G02B 27/09* (2013.01); *H01S 3/0071* (2013.01); *H01S 3/08086* (2013.01); *H01S 3/134* (2013.01)

(58) Field of Classification Search
None
See application file for complete search history.

(56) References Cited

U.S. PATENT DOCUMENTS

| | | | |
|---|---|---|---|
| 2018/0259779 A1 | 9/2018 | Tamura | |
| 2019/0283179 A1* | 9/2019 | Kakizaki | ............... H01S 3/2251 |

FOREIGN PATENT DOCUMENTS

| | | |
|---|---|---|
| JP | 2003-205383 | 7/2003 |
| JP | 2008-272794 A | 11/2008 |
| JP | 2011-152578 | 8/2011 |
| JP | 2012-218963 | 11/2012 |
| JP | 2013-146747 | 8/2013 |
| JP | 2013-539911 | 10/2013 |

(Continued)

OTHER PUBLICATIONS

Office Action dated Jul. 15, 2022 in Japanese Patent Application No. 2018-243957, 4 pages.

*Primary Examiner* — Mark Hellner
(74) *Attorney, Agent, or Firm* — Xsensus LLP

(57) ABSTRACT

An optical processing apparatus, an optical processing method, and an optically-processed product production method. The optical processing apparatus and the optical processing method includes emitting a first process light to a focal point set inside an object to be processed, using a first light-emitting unit, and emitting a second process light during a period of time in which plasma or gas is generated inside the object to be processed, by the first process light, using a second light-emitting unit. The processed product production method includes emitting a first process light to a focal point set inside an object to be processed, using a first light-emitting unit, and emitting a second process light during a period in which plasma or gas is generated inside the object to be processed by the first process light, using a second light-emitting unit.

19 Claims, 9 Drawing Sheets

(56) References Cited

FOREIGN PATENT DOCUMENTS

| | | | | |
|---|---|---|---|---|
| JP | 2014-213334 A | 11/2014 | | |
| JP | 2016-535675 A | 11/2016 | | |
| KR | 20080096400 A | * 10/2008 | ............. | B23K 26/16 |
| WO | WO2012/037780 A1 | 3/2012 | | |
| WO | WO 2016115017 A | * 7/2016 | ......... | B23K 26/0622 |

\* cited by examiner

OPTICAL PROCESSING APPARATUS, OPTICAL PROCESSING METHOD, AND OPTICALLY-PROCESSED PRODUCT PRODUCTION METHOD

CROSS-REFERENCE TO RELATED APPLICATION

This patent application is based on and claims priority pursuant to 35 U.S.C. § 119(a) to Japanese Patent Application No. 2018-003228, filed on Jan. 12, 2018, in the Japan Patent Office, the entire disclosure of which is hereby incorporated by reference herein.

BACKGROUND

Technical Field

Embodiments of the present disclosure relate to an optical processing apparatus, an optical processing method, and an optically-processed product production method.

Background Art

Optical processing apparatuses that process an object to be processed using a plurality of rays of process light are known in the art.

For example, a laser processor (optical processing apparatus) that processes an object to be processed made of transparency material, using two kinds of laser beams (process light), is known in the art. Such a laser processor irradiates an object to be processed with first laser beams of short pulse to form a transitory defective level, and then irradiates the object to be processed with second laser beams whose wavelengths are shorter than those of the first laser beam within a short period of time while the optical absorptance is increased. As a result, the first and second laser beams overlap with each other. Such a laser processor irradiates the object to be processed with the first laser beams to cause multiphoton absorption in a transparency material that does not absorb optical energy under normal circumstances, and forms a transitory defective level such as a color center at the portion where the multiphoton absorption is caused. As a result, the optical absorptance at that portion temporarily increases for a very short time. As the object to be processed is irradiated with the second laser beams in this state where the optical absorptance is increased, the optical energy of the second laser beams is transmitted to the transparency material in an efficient manner, and the processing (internal reforming or transpiration machining) advances.

SUMMARY

Embodiments of the present disclosure described herein provide an optical processing apparatus, an optical processing method, and an optically-processed product production method. The optical processing apparatus includes a first light-emitting unit configured to emit a first process light to a focal point set inside an object to be processed, and a second light-emitting unit configured to emit a second process light with a light-absorbing wavelength for plasma or gas generated inside the object to be processed, by the first process light. The optical processing method includes emitting a first process light to a focal point set inside an object to be processed, using a first light-emitting unit, and emitting a second process light during a period of time in which plasma or gas is generated inside the object to be processed, by the first process light, using a second light-emitting unit. The processed product production method includes emitting a first process light to a focal point set inside an object to be processed, using a first light-emitting unit, and emitting a second process light during a period in which plasma or gas is generated inside the object to be processed by the first process light, using a second light-emitting unit.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
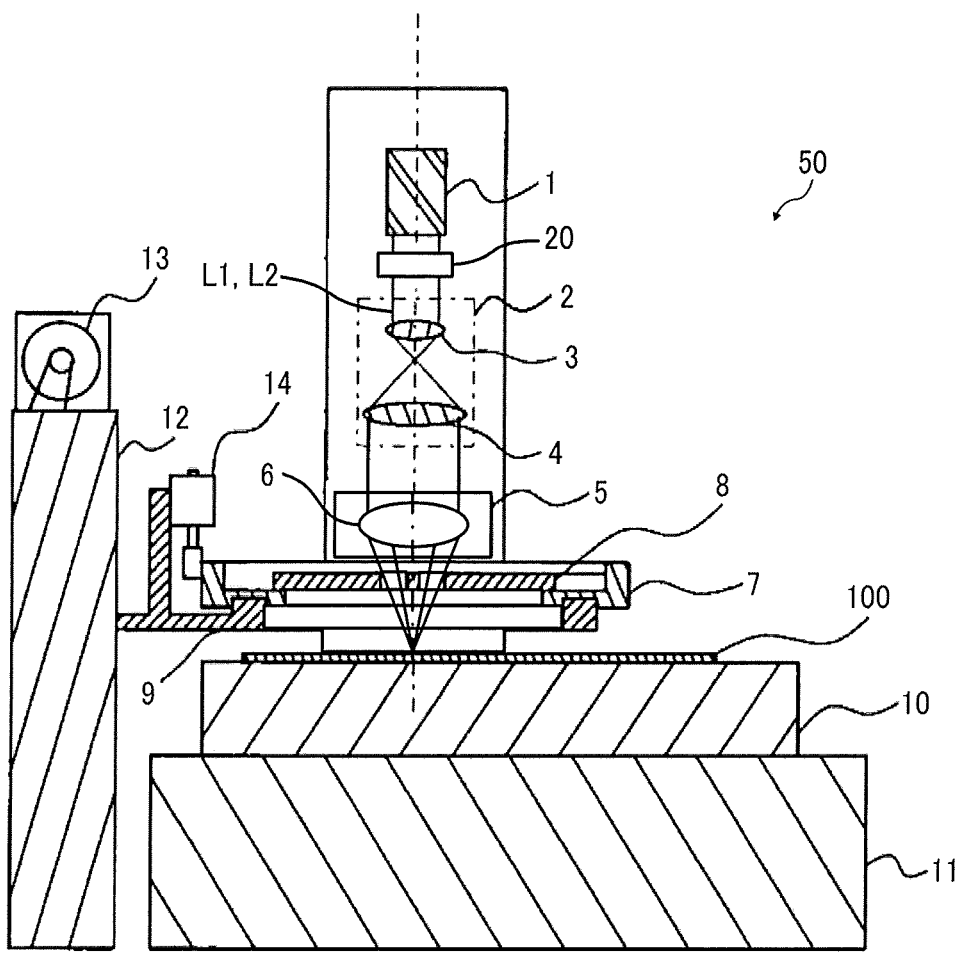
FIG. 1 is a sectional view of a laser processor, illustrating an outline of the configuration of the laser processor, according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

A laser processor according to an embodiment of the present disclosure that serves as an optical processing apparatus is described below. Firstly, a basic configuration of the laser processor according to the present embodiment is described.

FIG. 1 is a sectional view of a laser processor 50, illustrating an outline of the configuration of the laser processor 50, according to the present embodiment.

As illustrated in FIG. 1, the laser processor 50 includes, for example, a laser oscillator 1, a beam-expanding optical system 2, a beam transformation unit 5, a rotatable stage 7, an aperture 8, an upper and lower stage 9, an x-y table 10, a table foundation 11, a stage elevating mechanism 12, and an optical delay unit 20. The laser processor 50 also includes, for example, an up-and-down motor 13 and a stage rotary motor 14.

The laser oscillator 1 emits pulsed laser beams whose wavelength is λ and half-value pulse width is between 100 femtoseconds and 1 microsecond. The type of beam of the laser beams is a so-called Gaussian beam. As will be described later, the laser oscillator 1 according to the present embodiment emits a first laser beam L1 and a second laser beam L2 that serve as a first process light and a second process light, respectively.

The laser beams L1 and L2 that are emitted from the laser oscillator 1 enters the beam-expanding optical system 2. The beam-expanding optical system 2 is provided with a first lens 3 and a second lens 4, and as the laser beams pass through those first lenses 3 and second lenses 4 in sequence, the diameters of the laser beams L1 and L2 increase and the laser beams L1 and L2 are collimated. The laser beams L1 and L2 that are emitted from the second lens 4 enter the beam transformation unit 5.

The beam transformation unit 5 holds an objective lens 6 that serves as a light-concentrating unit, inside the tubular housing. The laser beams L1 and L2 that have entered the housing of the beam transformation unit 5 pass through the objective lens 6 and are thereby converted into thin Gaussian beams and are concentrated.

The Gaussian beams of the laser beams L1 and L2 that are emitted from the beam transformation unit 5 pass through a pass-through slot of the aperture 8 fixed to the rotatable stage 7, and then reach a transparent glass substrate 100 fixed onto the x-y table 10. The transparent glass substrate 100 serves as a light-transmissive object to be processed.

The x-y table 10 as illustrated in FIG. 1 is held onto the surface of the table foundation 11, and are movable in an X-axis direction (which may be referred to as "X-direction" in the following description) and an Y-axis direction (which may be referred to as "Y-direction" in the following description), independently, that are orthogonal to each other on a virtual plane orthogonal to the optical axis direction (Z-axis). AS x-y table moves in the X-direction or the Y-direction, the laser-processing point is adjusted with reference to the glass substrate 100.

As the first laser beam L1 according to the present embodiment, a short-pulse laser beam such as a picosecond laser beam whose pulse width is in a picosecond range or a femtosecond laser beam whose pulse width is in a femtosecond range is used. In the present embodiment, the first laser beam L1 composed of a short-pulse laser beam is used, and light is absorbed into the transparent glass substrate 100 that does not absorb optical energy under normal circumstances, due to multiphoton absorption processes. In such a configuration, nonthermal ablation processes are performed. According to such optical processing as above, a very small area can be irradiated with high-power laser beams that compress the energy in a short time and oscillates, and processing takes place only in an area where the energy density exceeds an extent sufficient to cause multiple photon absorption. As a result, processing area is limited to a very narrow area, and micromachining or fine patterning at a nanometer scale or high-quality processing with a high degree of precision can be achieved.

As described above, optical processing where the first laser beam L1 composed of a short-pulse laser beam is used is advantageous in performing shallow micromachining or fine patterning in a minute area. However, such optical processing is disadvantageous in performing deep and large-volume processing in a large area. In order to achieve large-volume processing with short-pulse laser beams, a large amount of energy is required, and the cost of a light source increases accordingly. It is desired that an improved optical processing method be proposed in which large-volume processing is achieved with a smaller amount of energy.

When multiphoton absorption occurs as above, typically, the phase of the materials of an area to be processed instantly changes from a solid state to gas or plasma. Note that the plasma or gas generated as above varies according to, for example, the materials of the object to be processed. In the related art, when short-pulse laser beam is emitted in a state where there is such residual gas or plasma, energy absorption into the materials of the object to be processed is prevented due to the light absorption and light reflection caused by the plasma or gas, and ablation processes are affected, which is considered to be disadvantageous in processing. According to the present embodiment, large-volume processing is achieved with a small amount of energy, using plasma or gas as above, which is considered to be disadvantageous in processing in the related art.

Figure 2:
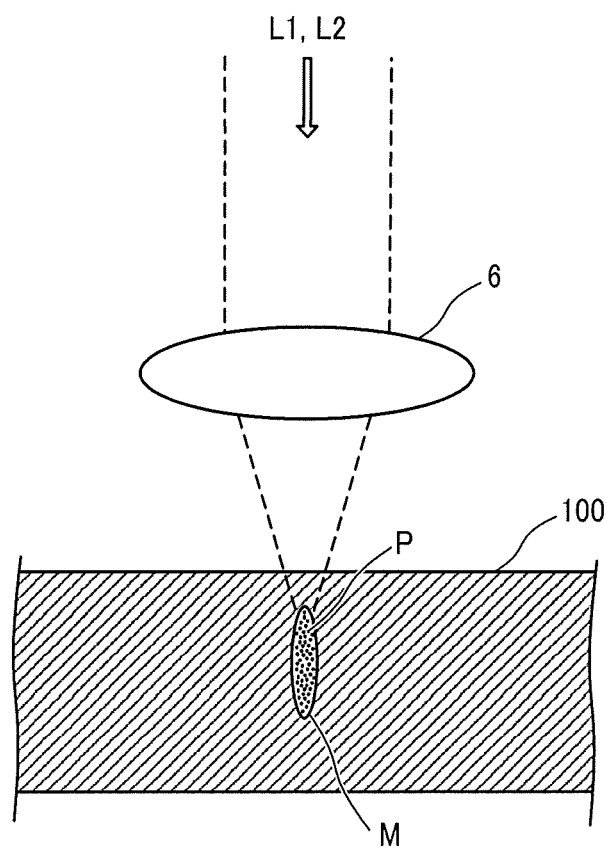
FIG. 2 is a diagram illustrating the principle of processing operation according to an embodiment of the present disclosure.

FIG. 2 is a diagram illustrating the principle of processing operation according to the present embodiment.

Figure 3A:
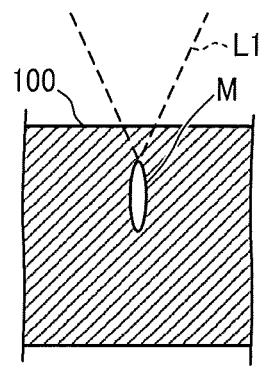
FIG. 3A to FIG. 3E are diagrams illustrating how the processes proceed, according to an embodiment of the present disclosure.

FIG. 3A to FIG. 3E are diagrams illustrating how the processes proceed, according to the present embodiment. In the present embodiment, at least, the first laser beam L1 is emitted such that the focal point (i.e., a first focal point) is inside the transparent glass substrate 100 (for example, 60 micrometers (μm) inside with reference to the surface of the glass substrate 100). Accordingly, at least some of the first laser beam L1 passes through the surface of the transparent glass substrate 100, and causes multiphoton absorption at a point inside the surface of the glass substrate 100 by certain depth. Accordingly, that point is ablated and a processed mark M is formed as illustrated in FIG. 3A.

The wavelength of the first laser beam L1 needs to be in a range sufficient to cause multiphoton absorption in the object to be processed. More specifically, the energy of one photon in the first laser beams L1 needs to be lower than the energy gap of the object to be processed. For example, when the material of the object to be processed is silicon (Si), one photon in the first laser beams L1 has an energy gap of about 1.1 electron-volt (eV). When the material of the object to be processed is silicon carbide (SiC), one photon in the first laser beams L1 has an energy gap of about 2.9 eV. When the material of the object to be processed is diamond, one photon in the first laser beams L1 has an energy gap of about 5.5 eV. When the material of the object to be processed is fused quartz, one photon in the first laser beams L1 has an energy gap of about 9.0 eV. The energy of one photon is dependent on the wavelength, and the energy of one photon is about 1.1 eV in the laser beams whose wavelength is 1064 nanometers (nm). Moreover, the energy of one photon is about 2.3 eV in the laser beams whose wavelength is 532 nm, and the energy of one photon is about 3.5 eV in the laser beams whose wavelength is 355 nm.

Figure 3B:
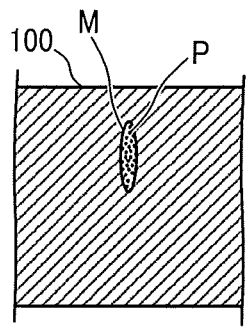
Figure 4:
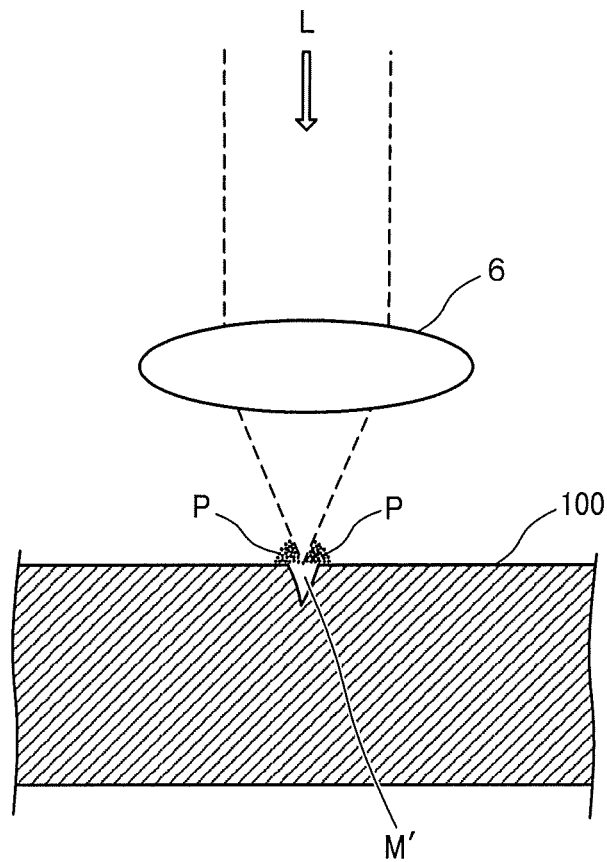
FIG. 4 is a diagram illustrating how ablation processes are typically performed, according to the related art.

In the present embodiment, as illustrated in FIG. 3B, plasma or the gas P is generated in a similar manner to typical ablation processes (ablation processes that start from the surface of an object to be processed). As illustrated in FIG. 4, in typical ablation processes, the generated plasma or gas P instantly diffuses or dissipates from the surface of the glass substrate 100 to the outside. However, in the present embodiment, as illustrated in FIG. 2 or FIG. 3B, the generated plasma or gas P is generated in the processed mark M formed inside the glass substrate 100 (i.e., the processed mark formed by the first laser beams L1). For this reason, the generated plasma or gas P stays inside the processed mark M and does not diffuse. In other words, in the present embodiment, the focal point of the first laser beams L1 is set inside the glass substrate 100 in order to keep the plasma or the gas P that is used to achieve large-volume processing inside the area to be processed (i.e., the processed mark M), and the processed mark M formed inside the glass substrate 100.

Figure 3C:
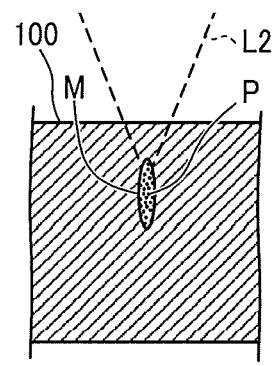

In the present embodiment, as illustrated in FIG. 3C, the gas or the plasma P staying inside the processed mark in the glass substrate 100 is irradiated with the second laser beams L2 that include light-absorbing wavelengths for the plasma or the gas P. As a result, the gas or plasma P absorbs the optical energy of the second laser beams L2. As the plasma or the gas P has a high light-absorption coefficient compared with a solid object, the plasma or gas can absorb most of the second laser beams L2 More specifically, the absorption rate of the plasma is expressed as an absorption coefficient $\alpha_{IB}$ as in Formula 1 given below. In the Formula 1 as given below, "ne" denotes electron density and "Te" denotes electron temperature.

$$\alpha_{IB} = 1.37 \times 10^{-35} \lambda^3 n_e^2 T_e^{-1/2}$$ Formula 1

As expressed in the Formula 1 as above, the absorption coefficient $\alpha_{IB}$ of the plasma is higher as the wavelength of the light is wider. Accordingly, as the wavelengths of the second laser beams L2 are wider, the plasma P can more efficiently absorb the optical energy of the second laser beams L2. It is desired that the wavelength of the second laser beams L2 be wavelength λ where the absorption coefficient $\alpha_{IB}$ of the plasma generated in the processed mark M becomes equal to or greater than 20 centimeters (cm)$^{-1}$. In particular, it is desired that the wavelengths of the second laser beams L2 be equal to or greater than 700 nm.

Figure 3D:
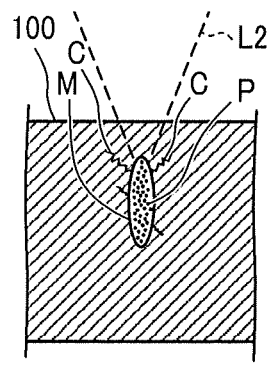
Figure 3E:
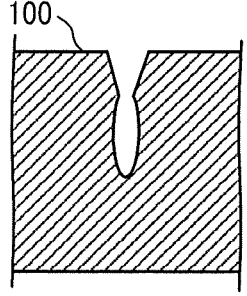

Once the gas or plasma P absorbs the optical energy of the second laser beam L2, the temperature of the gas or plasma P gets high, and the pressure inside the processed mark M in the glass substrate 100 increases. Accordingly, as illustrated in FIG. 3D, the processed mark M is expanded, and a crack C can be caused towards the surface of the glass substrate 100. When the processed mark M or the crack C expands close to the surface of the glass substrate 100, the internal pressure inside processed mark M is released and the materials of the glass substrate 100 near the surface explode and disperse. Accordingly, large-volume processing is achieved as illustrated in FIG. 3E.

Technical features of the present disclosure are described below.

Figure 5:
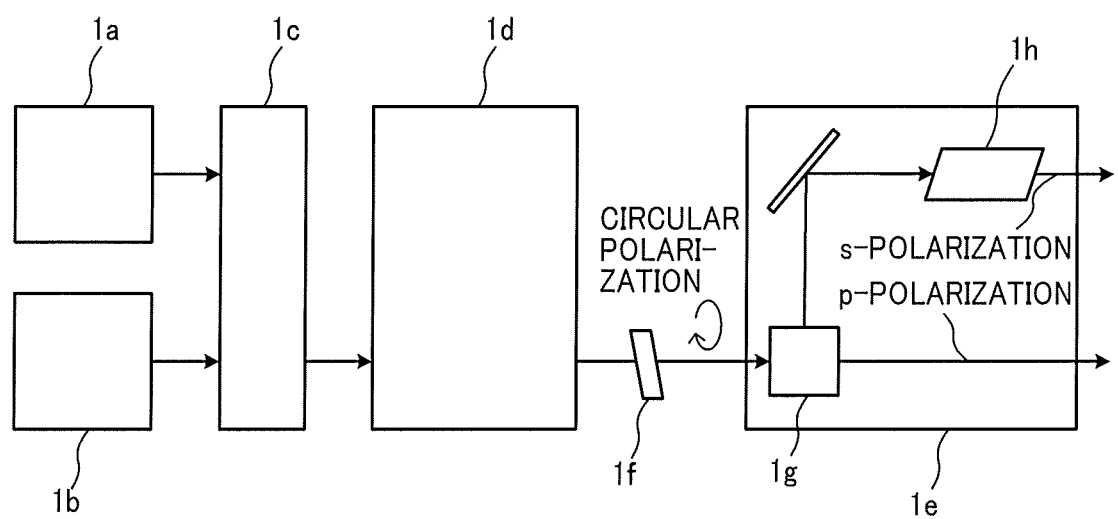
FIG. 5 is a diagram illustrating a configuration of a laser oscillator of a laser processor, according to an embodiment of the present disclosure.

FIG. 5 is a schematic diagram illustrating a configuration of the laser oscillator 1 of the laser processor 50, according to the present embodiment. A known mode-locked laser beam source may be adopted for the laser oscillator 1 according to the present embodiment. The laser oscillator 1 according to the present embodiment includes a seed unit 1a, a pump unit 1b, a combining unit 1c, a regenerative amplifier 1d, and a wavelength converter 1e. The combining unit 1c combines the seed light emitted from the seed unit 1a and the pump light emitted from the pump unit 1b, to form low-power short-pulse laser beams. The regenerative amplifier 1d amplifies the pulse energy of the short-pulse laser beams that are emitted from the combining unit 1c. Accordingly, short-pulse laser beams that have optical energy sufficient to perform laser processing can be obtained.

Subsequently, the short-pulse laser beams that are emitted from the regenerative amplifier 1d is circularly polarized by a wave plate 1f. Then, the wavelength converter 1e uses a prism beam splitter 1g to separate the circularly-polarized short-pulse laser beams into p-polarized light components and s-polarized light components. As one of the two types of short-pulse laser beams separated as above (i.e., the s-polarized light components in the present embodiment) passes through a lithium troborae (LBO) element 1h that is a crystal generated by second harmonic generation (SHG), short-pulse laser beams having a half wavelength are generated. As a result, two kinds of short-pulse laser beams with different wavelengths, which are composed of fundamental waves and harmonics (by SHG), respectively, can be generated and output from the laser oscillator 1 according to the present embodiment.

In the present embodiment, the fundamental waves whose wavelength is 1064 nanometers (nm) are used as the second laser beams L2, and the harmonics (by SHG) whose wavelength is 532 nm are used as the first laser beams L1. All of the pulse widths is 15 picoseconds, and the cycle in which the pulse alternates is in a range of microsecond (μs) (for example, 5 microseconds. In the present embodiment, two kinds of short-pulse laser beams are generated that are composed of fundamental waves and harmonics (by SHG). However, short-pulse laser beams with wavelengths equal to or shorter than harmonics by third harmonic generation (THG) may be generated.

Figure 6:
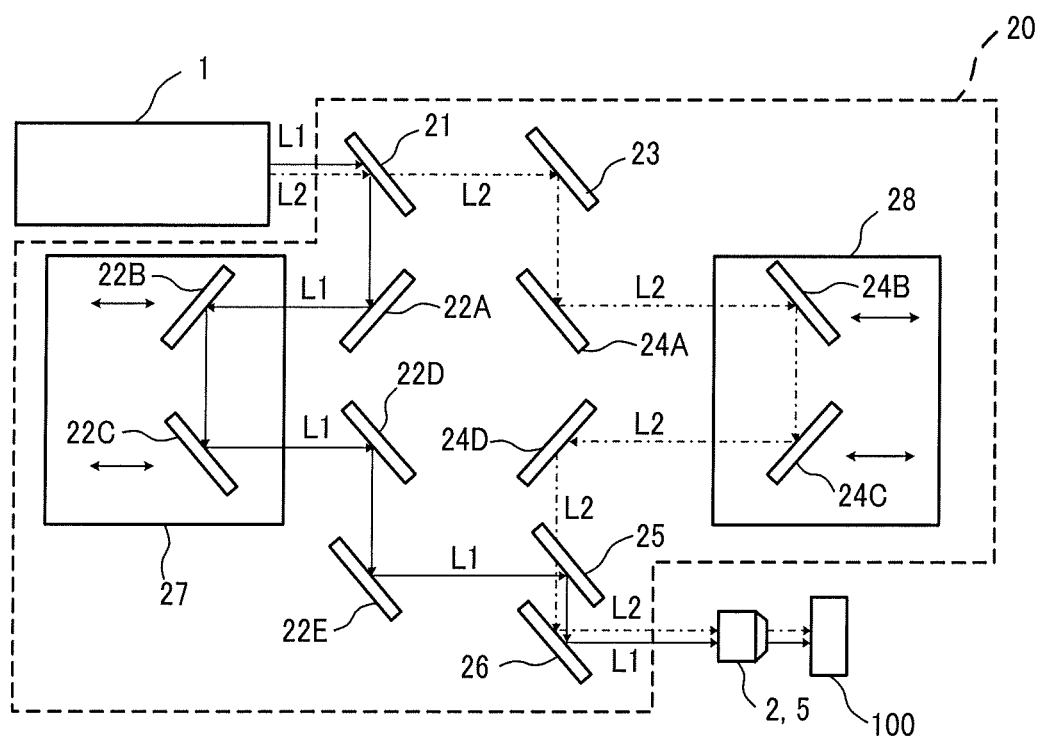
FIG. 6 is a diagram illustrating a configuration of an optical delay unit of a laser processor, according to an embodiment of the present disclosure.

FIG. 6 is a diagram illustrating a configuration of the optical delay unit 20 of the laser processor 50, according to the present embodiment.

As described above, in the present embodiment, the gas or plasma generated by the first laser beams L1 inside the processed mark in the glass substrate 100 is irradiated with the second laser beams L2. Subsequently, the gas or plasma P absorbs the optical energy of the second laser beam L2, and the internal pressure inside processed mark M increases. Accordingly, large-volume processing is achieved. Here, it is known in the art that it takes some time of the order of picoseconds or nanoseconds until plasma or gas is generated inside the processed mark M in the glass substrate 100 after the irradiation with the first laser beams L1 is started.

The second laser beams L2 are different from the first laser beams L1. In particular, the second laser beams L2 are not primarily intended to make the materials of the glass substrate 100 absorb optical energy directly to advance the processing, but the second laser beams L2 are primarily intended to make plasma or gas absorb optical energy. For this reason, it is satisfactory as long as the plasma or gas is irradiated with the second laser beams L2 during some of or all of the period of time in which the plasma or gas exists in the processed mark. Accordingly, in order to shorten the period of time in which the plasma or gas is irradiated with the second laser beams L2 with a view to reducing energy requirements, it is desired that the second laser beams L2 start irradiating the gas or plasma after the first laser beams L1 has started irradiating the plasma or gas and before or during the period of time in which the plasma or gas exists inside the glass substrate 100 due to the first laser beams L1.

For the above reasons, in the present embodiment, the optical delay unit 20 is provided such that the length of time delay of the second laser beams L2 with reference to the first laser beams L1 can be adjusted between 0 picosecond and 2000 picoseconds. It is desired that the second laser beams L2 start irradiating the plasma or gas within a range of 20 picoseconds later to 2000 picoseconds later after the first laser beams L1 has started irradiating the plasma or gas.

In particular, as illustrated in FIG. 6, the first laser beams L1 (S-polarized light) and the second laser beams L2 (P-polarized light) that are simultaneously output from the laser oscillator 1 are split up into the first laser beams L1 and the second laser beams L2 by a first dichroic mirror 21. The optical path of the first laser beams L1 is turned by first reflective optical elements 22A, 22B, 22C, 22D, and 22E that are, for example, mirrors and configure a first light-emitting unit, and are incident on a second dichroic mirror 25. After the optical path of the second laser beams L2 is turned by a third reflective optical element 23 that is, for example, a mirror and configure a second light-emitting unit, the optical path of the second laser beams L2 is turned by second reflective optical elements 24A, 24B, 24C, and 24D that are, for example, mirrors, and are incident on the second dichroic mirror 25. Due to this configuration, from the second dichroic mirror 25 the first laser beams L1 (S-polarized light) and the second laser beams L2 (P-polarized light) are combined and output, and are turned by a fourth reflective optical element 26 and output.

The optical delay unit 20 according to the present embodiment includes a first delay optical device 27 that shifts two of the five first reflective optical elements 22A, 22B, 22C, 22D, and 22E, i.e., the first reflective optical elements 22B and 22C in the right and left directions in the drawing to adjust the optical path length of the first laser beams L1. In a similar manner, the optical delay unit 20 includes a second delay optical device 28 that shifts two of the four second reflective optical elements 24A, 24B, 24C, and 24D, i.e., the second reflective optical elements 24B and 24C in the right and left directions in the drawing to adjust the optical path length of the second laser beams L2.

In the optical delay unit 20, the optical path length of the first laser beams L1 and the optical path length of the second laser beams L2 are changed by the first delay optical device 27 and the second delay optical device 28. Due to this configuration, the length of time delay of the second laser beams L2 with reference to the first laser beams L1 can be adjusted between 0 picosecond and 2000 picoseconds.

An optical delay unit that changes the optical path length may be configured by either one of the first delay optical device 27 and the second delay optical device 28. However, it is desired that optical delay unit be configured by both the first delay optical device 27 and the second delay optical device 28 as in the present embodiment in order to set the length of time delay more precisely.

In order to shorten the period of time in which the plasma or gas is irradiated with the second laser beams L2 with a view to reducing energy requirements, it is desired that the second laser beams L2 stop irradiating the plasma or gas at a certain timing after or during the period of time in which the plasma or gas exists inside the glass substrate 100 due to the first laser beams L1.

Some experiments in which the laser processor 50 according to the present embodiment is used is described below. In the experiments referred to in the present disclosure, the transparent glass substrate 100 that is made of fused quartz is used as an object to be processed. Trench digging is performed on the surface of the glass substrate 100 to form a trench thereon, and the glass substrate 100 is torn.

Figure 7:
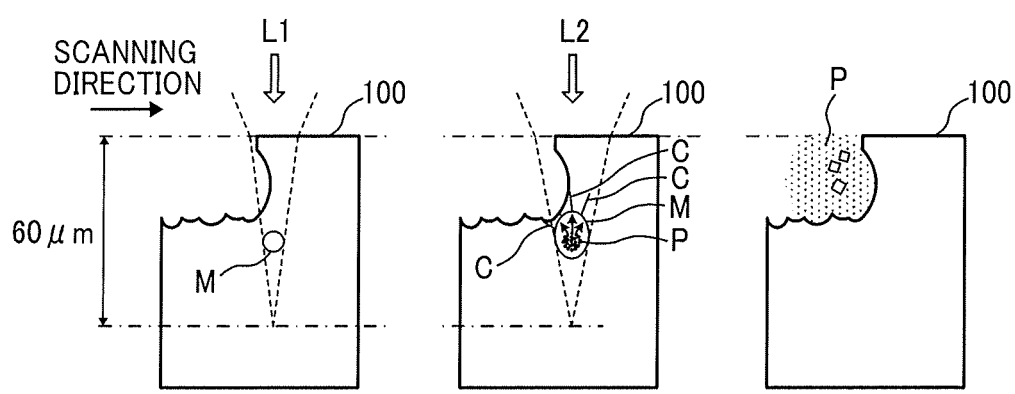
FIG. 7A, FIG. 7B, and FIG. 7C are diagrams each illustrating an experimental condition, according to an embodiment of the present disclosure.

FIG. 7A, FIG. 7B, and FIG. 7C are diagrams illustrating the experimental conditions and how the processes proceed in the experiments referred to in the present disclosure. In the experiments referred to in the present disclosure, the focal point of the first laser beams L1 is set 60 μm inside the surface of the glass substrate 100, and is processed such that the surface of the glass substrate 100 are scanned by the spots of the first and second laser beams L1 and L2 with the speed of 0.01 millimeter (mm)/second (s). In the experiments referred to in the present disclosure, an experiment in which processing is performed using only first laser beams L1' and an experiment in which processing is performed using both the first laser beams L1 and the second laser beams L2 are conducted. Note that the wavelength of the first laser beams L1' and L1 is 532 nm and the wavelength of the second laser beams L2 is 1064 nm. Note also that all of the pulse widths is 15 picoseconds and the cycle in which the pulse alternates is 5 microseconds.

In the experiment where only the first laser beams L1' are used, the first laser beams L1' whose pulse energy is 4.5 μJ are used. By contrast, in the experiment where both the first laser beams L1 and the second laser beams L2 are used, the first laser beams L1 whose pulse energy is 3.3 μJ and the second laser beams L2 whose pulse energy is 1.2 μJ are used. In the experiment where both the first laser beams L1 and the second laser beams L2 are used, the length of time delay of the second laser beams L2 with reference to the first laser beams L1 are set to three patterns including 0 picosecond, 100 picoseconds, and 2000 picoseconds. Note that the numerical aperture (NA) of the imaging optical element (lens) used in this experiment is 0.4.

Figure 8:
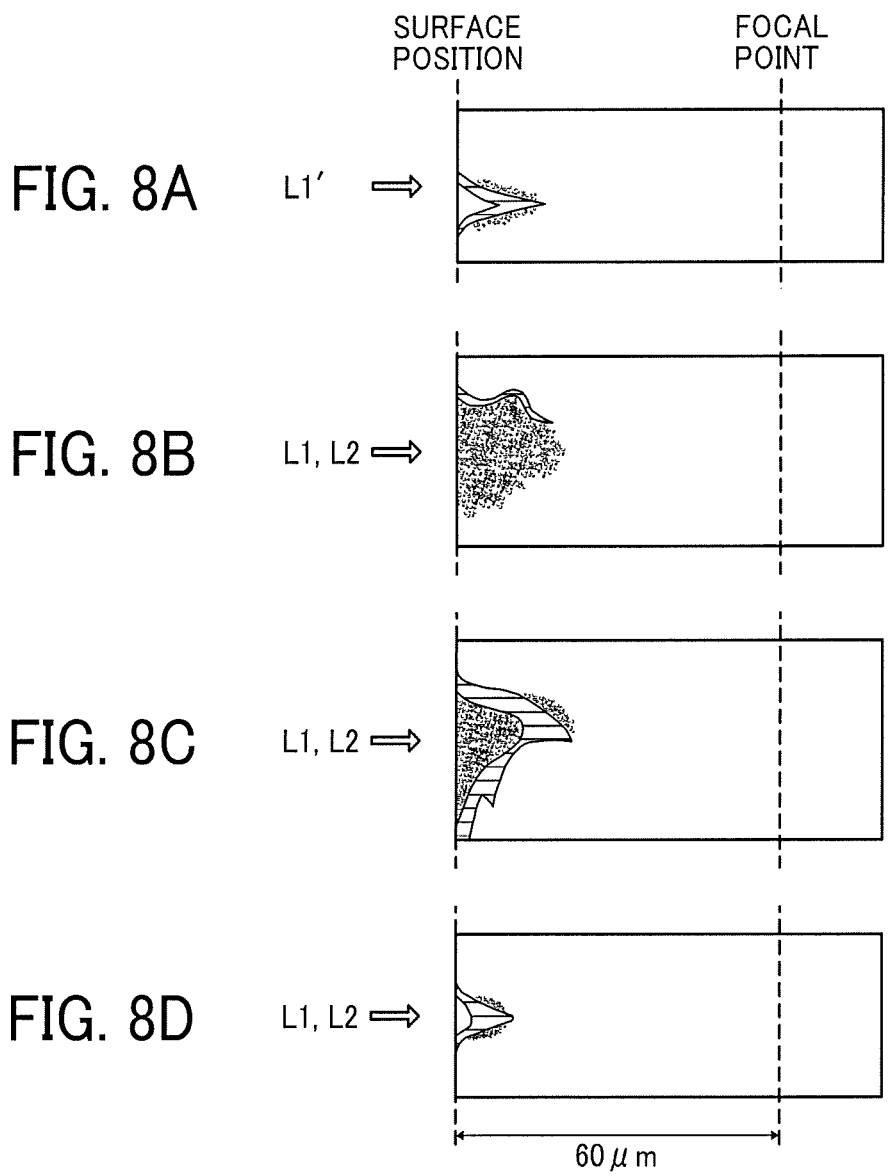
FIG. 8A to FIG. 8D are schematic diagrams each illustrating a state of a glass substrate processed in an experiment, according to an embodiment of the present disclosure.

FIG. 8A to FIG. 8D are schematic diagrams each illustrating a state of the glass substrate 100 processed in the experiments referred to in the present disclosure. In the experiment where only the first laser beams L1' are used, as illustrated in FIG. 8A, a relatively deep processed mark (i.e., the shaded area in the drawing) is formed near the surface of the glass substrate 100. However, the processed width (i.e., the length in the up-and-down directions in the drawing) is relatively narrow. As a result, the volume of the processed area is small.

By contrast, an experiment where both the first laser beams L1 and the second laser beams L2 are used is described below. When the length of time delay is 0 picosecond and there is no delay, as illustrated in FIG. 8B, the processed mark (i.e., the shaded area in the drawing) becomes small. In the drawings, the area hatched by dots indicates an area in which reforming of material has occurred. In other words, reforming of material occurs in a relatively wide range when there is no delay. However, the processing is so insufficient that a processed mark is not formed to a desired degree in this area.

When the length of time delay of the second laser beams L2 with reference to the first laser beams L1 is 100 picoseconds, as illustrated in FIG. 8C, the processed mark (i.e., the shaded area in the drawing) is formed across a relatively wide range. By continuing the processing afterward, the material can be removed from most of the area surrounded by the processed mark. Accordingly, large-volume processing is achieved.

When the length of time delay of the second laser beams L2 with reference to the first laser beams L1 is 2000 picoseconds, as illustrated in FIG. 8D, the processed mark (i.e., the shaded area in the drawing) is formed across a relatively narrow area. By continuing the processing afterward, the material can be removed from most of the area surrounded by the processed mark. However, the volume of the processed area is smaller than that of FIG. 8C.

According to the experiments as described above, when the length of time delay of the second laser beams L2 with reference to the first laser beams L1 is set to 100 picoseconds, large-volume processed area can be achieved.

In the experiments referred to in the present disclosure, when an area inside the transparent glass substrate 100 (where the focal point is 60 micrometers (μm) inside with reference to the surface of the glass substrate 100) is irradiated with one pulse (15 picoseconds) of the first laser beams L1, multiphoton absorption is caused at a point inside the surface of the glass substrate 100 by certain depth, and that point is ablated and a processed mark M is formed as illustrated in FIG. 7A. Once the irradiation with one pulse of the first laser beams L1 is completed, as illustrated in FIG. 7B, irradiation with one pulse (15 picoseconds) of the second laser beams L2 starts after a certain length of time (100 picoseconds after the irradiation with the first laser beams L1 started) has passed. As a result, after a certain length of time has passed since the first laser beams L1 started irradiating the plasma or gas, the plasma or gas P generated in the processed mark M can absorb the optical energy of the second laser beams L2.

In particular, when the length of time delay of the second laser beams L2 with reference to the first laser beams L1 is set to 100 picoseconds, wasteful irradiation with the second laser beams L2 in a stage where plasma or gas P is not yet generated can be avoided. Moreover, the plasma or gas P generated in the processed mark M can be irradiated for a longer time with the second laser beams L2, which are emitted only for a very short time corresponding to the pulse width of 15 picoseconds. As a result, the gas or plasma P generated in the processed mark M absorbs the optical energy of the second laser beam L2, and the temperature of the gas or plasma P gets high and the pressure inside the processed mark M increases. Further, as illustrated in FIG. 7B, the processed mark M is expanded, and a crack C can be caused towards the surface of the glass substrate 100. When the processed mark M or the crack C expands close to the surface of the glass substrate 100 (including the already-processed surface exposed to the outside), as illustrated in FIG. 7C, the internal pressure inside processed mark M is released and the materials explode and disperse. Accordingly, large-volume processing is achieved.

In the experiments referred to in the present disclosure, the focal point of the second laser beams L2 matches the focal point of the first laser beams L1. However, the focal point of the second laser beams L2 does not necessarily match the focal point of the first laser beams L1. For example, it is confirmed in the experiments referred to in the present disclosure that similar experimental results are obtained even when the focal point of the second laser beams L2 is shifted by several tens of micrometers (μm).

In the experiments referred to in the present disclosure, the numerical aperture (NA) of the imaging optical element is 0.4. When an object to be processed having optical transparency is processed (i.e., when a transparency material is to be processed), it is desired that the NA of the imaging optical element be equal to or wider than 0.1 in order to increase the energy density of the first and second laser beams L1 and L2. In such a configuration, typically, the focal depth is about several tens of micrometers (μm) to several hundreds of micrometers (μm). For this reason, the applicable processing in this configuration is limited to the processing performed within the distance of several hundreds of micrometers (μm) with reference to the surface of the object to be processed when processing is conducted by one-time scanning. However, processing to a deeper portion can be achieved by conducting scanning a plurality of times.

When an object to be processed having optical transparency is processed (i.e., when a transparency material is to be processed), it is desired that the pulse widths of the first and second laser beams L1 and L2 be short in order to increase the energy density per unit time. For example, it is desirable when the pulse widths of the first and second laser beams L1 and L2 are equal to or smaller than 20 picoseconds. In the experiments referred to in the present disclosure, picosecond laser beams are used. However, femtosecond laser beams may be used instead.

In the present embodiment, the same light source, i.e., the laser oscillator 1, is used for the light source of the first laser beams L1 and the light source of the second laser beams L2 in common. However, the light source of the first laser beams L1 and the light source of the second laser beams L2 may separately be provided. In such a configuration, the degree of flexibility in, for example, the pulse width, the wavelength, and the pulse energy of the first laser beams L1 and the second laser beams L2 is enhanced. Moreover, the degree of flexibility in the length of delay time of the second laser beams L2 with reference to the first laser beams L1 can also be enhanced. In this configuration, the timing at which the first laser beams L1 and the second laser beams L2 are output from the respective light sources may be controlled such that the second laser beams L2 will be delayed with reference to the first laser beams L1.

However, it is advantageous in cost when the same light source (i.e., the laser oscillator 1) is used. Alternatively, when harmonics such as second harmonic generation (SHG) are used as the first laser beams L1, as in the present embodiment, fundamental waves that are not used in many other operations may be used as the second laser beams L2. Due to this configuration, the cost of energy can be reduced.

Alternatively, an optical controller may be arranged in the optical paths of the first laser beams L1 or the second laser beams L2. Such an optical controller may be, for example, a special-purpose lens that generates special laser beams and a diffraction element. However, no limitation is intended thereby, and it is satisfactory as long as the optical controller can alter the state or characteristics of the first laser beams L1 or the second laser beams L2. Alternatively, such an optical controller may be a liquid crystal element that controls the shape of transmission light using, for example, the functionality of liquid crystal. As a beam-shape changing unit such as a liquid crystal element that chronologically changes the shape of beam with a prescribed frequency (for example, at a frequency of several tens of hertz (Hz)) is provided, optical processing can be performed while changing the shape of beam.

Figure 9:
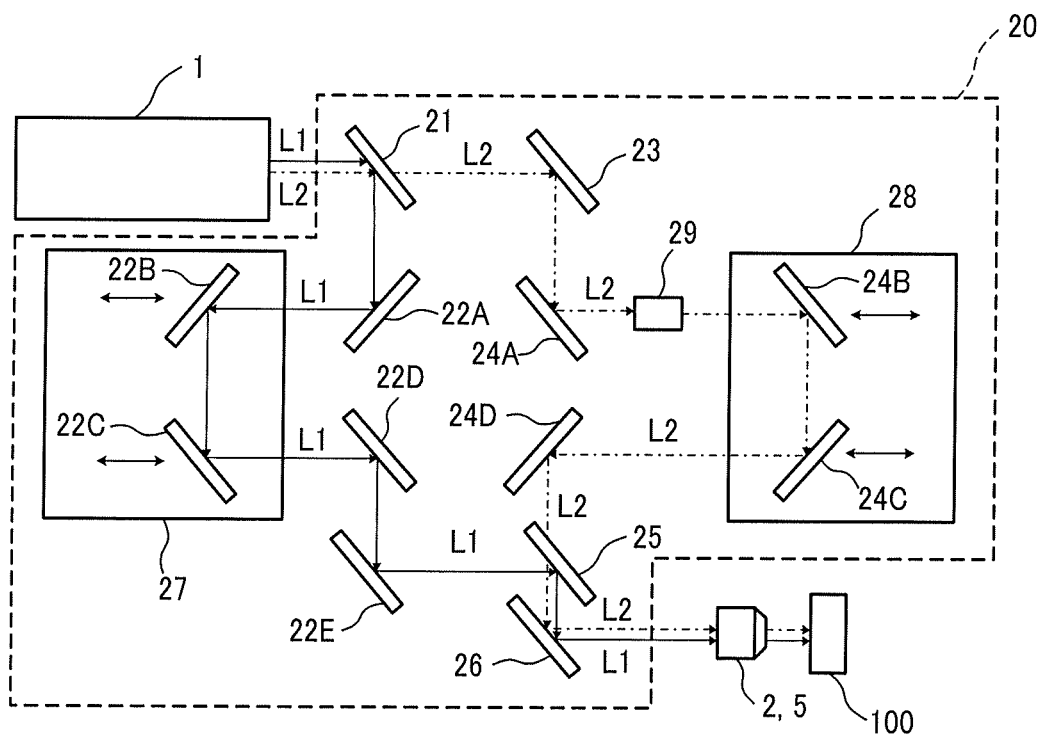
FIG. 9 is a diagram illustrating a configuration in which an optical controller that changes a shape of beam is additionally disposed in the optical path of second laser beams, according to an embodiment of the present disclosure.

FIG. 9 is a diagram illustrating a configuration in which an optical controller 29 that changes a shape of beam as a beam-shape changing unit is additionally disposed between the second reflective optical elements 24A and 24B in the optical path of the second laser beams L2, according to an embodiment of the present disclosure.

By arranging such an optical controller to change the beam-shape of the second laser beams L2, the plasma or gas P generated in the processed mark M due to the first laser beams L1 can efficiently absorb the optical energy of the second laser beams L2, and processing can be performed more efficiently. For example, when an axicon lens may be used as the optical controller 29 to output Bessel beams (round beam-shape), the second laser beams L2 with a greater focal depth (for example, equal to or less than 200 micrometers ($\mu$m)) can be generated. Due to this configuration, the shape of the processed mark M in the object to be processed can be expanded in the focused direction.

In a configuration where an optical controller that changes a shape of beam is additionally disposed in the optical path of the first laser beams L1, for example, an axicon lens may be used as the optical controller to output Bessel beams (round beam-shape). Due to this configuration, the concentration of energy on the surface of the object to be processed can be reduced. Accordingly, the energy can be passed inside the object to be processed in an efficient manner, and the processed mark M can efficiently be formed inside the object to be processed.

In the present embodiment, the optical path length is changed to delay the second laser beams L2 with reference to the first laser beams L1. However, no limitation is intended thereby. For example, the second laser beams L2 may be delayed by adopting a configuration in which only the second laser beams L2 pass through an optical fiber, or delay may be achieved by the electric control performed inside the light source.

The embodiments described above are given as an example, and advantageous effects are achieved for each of the following modes A to N.

Mode A

An optical processing apparatus (for example, the laser processor 50) processes an object to be processed (for example, the glass substrate 100) using a plurality of process lights (for example, the first laser beams L1 and the second laser beams L2). The optical processing apparatus includes a first light-emitting unit (for example, the first dichroic mirror 21, the five first reflective optical elements 22A, 22B, 22C, 22D, and 22E, the second dichroic mirror 25, the fourth reflective optical element 26, the beam-expanding optical system 2, and the beam transformation unit 5) that emits a first process light (for example, the first laser beams L1) to a focal point set inside an object to be processed, and a second light-emitting unit (including, for example, the first dichroic mirror 21, the third reflective optical element 23, the second reflective optical elements 24A to 24D, the second dichroic mirror 25, the fourth reflective optical element 26, the beam-expanding optical system 2, and the beam transformation unit 5) configured to emit a second process light with a light-absorbing wavelength for plasma or gas P generated inside the object to be processed by the first process light. An optical processing apparatus according to the related art, which processes an object to be processed using a plurality of process lights, emits the first process light to the object to be processed to cause a transitory structural defect, and irradiates a portion with increased optical absorptance with the second process light. As a result, for example, the materials of the object to be processed transpires due to the optical energy of the second process light. Accordingly, some of the materials is removed and the processing proceeds. However, in such a processing method, a large amount of energy is required in order to remove a larger amount of materials from the object to be processed having optical transparency to achieve large-volume processing. In the present mode, the first light-emitting unit emits the first process light to a focal point set inside the object to be processed. Accordingly, in the object to be processed having optical transparency, the first process light can reach a point inside the object to be processed, and a processed mark can be generated inside the object to be processed. In the process of generating a processed mark, plasma or the gas is generated in a similar manner to the known ablation processes with process lights, which start from the surface of an object to be processed. At that time, in the known ablation processes, the generated plasma or gas instantly diffuses or dissipates from the surface of the object to be processed to the outside. By contrast, in the present mode, the plasma or gas is generated in the processed mark formed inside object to be processed. Accordingly, the plasma or gas stays inside the processed mark and does not diffuse. In the present mode, as described above, the gas or plasma staying inside the processed mark in the object to be processed is irradiated with the second process light that includes light-absorbing wavelengths for the plasma or gas. As a result, the plasma or gas absorbs the optical energy of the second process light, and the processed mark is expanded and a crack is caused towards the surface of the object to be processed When the processed mark or the crack expands close to the surface of the object to be processed, the internal pressure inside processed mark is released and the materials of the object to be processed near the surface explode and disperse. Accordingly, large-volume processing is achieved.

Mode B

In the above Mode A, the second light-emitting unit starts emitting the second process light after the first process light has started irradiation and before or during a period of time in which the plasma or the gas exists inside the object to be processed due to the first process light. According to the present mode, the length of time for which the second laser beams L2 are unnecessarily emitted can be reduced, and the energy consumption can be reduced.

Mode C

In the Mode B, wherein the second light-emitting unit starts emitting the second process light within a range of 20 picoseconds later to 2000 picoseconds later after the first process light is emitted. According to the present mode, the length of time for which the second laser beams L2 are unnecessarily emitted can be reduced, and the energy consumption can be reduced.

Mode D

In any one of the above Modes A to C, the second light-emitting unit stops emitting the second process light after or during a period of time in which the plasma or the gas exists inside the object to be processed due to the first process light. According to the present mode, the length of time for which the second laser beams L2 are unnecessarily emitted can be reduced, and the energy consumption can be reduced.

Mode E

In any one the above modes A to D, the second light-emitting unit emits the second process light during a period where the object to be processed is not irradiated with the first process light. According to the present mode, the plasma or gas can efficiently absorb the optical energy of the second process light.

Mode F

In any of one of the above Modes A to E, the second process light has a wavelength longer than a wavelength of the first process light. According to the present mode, both a desirable first process light that forms a processed mark inside the object to be processed and a desirable second process light with a light-absorbing wavelength for the plasma or gas generated in the processed mark can be achieved without difficulty.

Mode G

In any one of the Modes A to F, the second process light has a wavelength $\lambda$ in which absorption coefficient $\alpha_{IB}$ that satisfies the Formula 1 as described above is equal to or greater than 20 cm$^{-1}$. According to the present mode, the plasma or gas generated in the processed mark can efficiently absorb the optical energy of the second process light.

Mode H

In any one of the modes A to G, the second process light has a wavelength equal to or longer than 700 nanometers. According to the present mode, the plasma or gas generated in the processed mark can efficiently absorb the optical energy of the second process light.

Mode I

In any one of the modes A to H, the optical processing apparatus further includes a laser beam source (for example, the laser oscillator 1) that emits a pulsed laser beam having a prescribed pulse width (for example, 15 picoseconds). The first light-emitting unit irradiates the object to be processed with some of a pulsed laser beam output from the laser beam source as the first process light, and the second light-emitting unit irradiates the object to be processed with remaining ones of the pulsed laser beam output from the laser beam source as the second process light, in a delayed manner. According to the present mode, a reduction in cost can easily be achieved.

Mode J

In the above mode I, the first light-emitting unit and the second light-emitting unit share the same light-concentrating unit (for example, the objective lens 6) to irradiate the object to be processed with the first process light and the second process light, respectively. According to the present mode, a reduction in cost can easily be achieved.

Mode K

In any one of the modes A to J, the second light-emitting unit emits the second process light to a focal point set inside the object to be processed. According to the present mode, most of the elements of the second light-emitting unit can be shared with the elements of the first light-emitting unit, and thus a reduction in cost can easily be achieved.

Mode L

In any one of the modes A to K, the second process light has a depth of focus equal to or smaller than 200 micrometers. According to the present mode, a deeper portion of the object to be processed can be processed or machined.

Mode M

In any one of the modes A to L, at least one of wherein the first process light and the second process light is a pulsed laser beam having a pulse width equal to or smaller than 20 picoseconds. According to the present mode, the energy density of the first process light and the second process light per unit time can be increased.

Mode N

In any one of the modes A to M, the second process light has a shape of beam different from the shape of beam of the first process light inside the object to be processed. According to the present mode, both a desirable first process light that forms a processed mark inside the object to be processed and a desirable second process light with a light-absorbing wavelength for the plasma or gas generated in the processed mark can be achieved without difficulty.

Mode O

In the above mode N, wherein the second process light has a circular shape of beam inside the object to be processed. According to the present mode, a deeper portion of the object to be processed can be processed or machined.

Mode P

In any one of the modes A to O, the optical processing apparatus further includes a beam-shape changing unit that changes a shape of beam of the second process light. According to the present mode, processing or machining can be performed with the second process light having a shape of beam suitable for various kinds of processing or machining.

Mode Q

In the above Mode P, the beam-shape changing unit chronologically changes the shape of beam of the second process light with a prescribed frequency. According to the present mode, optical processing can be performed while chronologically changing the shape of beam of the second process light with a prescribed frequency.

Mode R

A method of processing an object to be processed using a plurality of process lights. The method includes a step of emitting a first process light to a focal point set inside the object to be processed, using a first light-emitting unit, and a step of emitting a second process light during a period in which plasma or gas is generated inside the object to be processed by the first process light, using a second light-emitting unit. An optical processing apparatus according to the related art, which processes an object to be processed using a plurality of process lights, emits the first process light to the object to be processed to cause a transitory structural defect, and irradiates a portion with increased optical absorptance with the second process light. As a result, for example, the materials of the object to be processed transpires due to the optical energy of the second process light. Accordingly, some of the materials is removed and the processing proceeds. However, in such a processing method, a large amount of energy is required in order to remove a larger amount of materials from the object to be processed having optical transparency to achieve large-volume processing. In the present mode, the first light-emitting unit emits the first process light to a focal point set inside the object to be processed. Accordingly, in the object to be processed having optical transparency, the first process light can reach a point inside the object to be processed, and a processed mark can be generated inside the object to be processed. In the process of generating a processed mark, plasma or the gas is generated in a similar manner to the known ablation processes with process lights, which start from the surface of an object to be processed. At that time, in the known ablation processes, the generated plasma or gas instantly diffuses or dissipates from the surface of the object to be processed to the outside. By contrast, in the present mode, the plasma or gas is generated in the processed mark formed inside object to be processed. Accordingly, the plasma or gas stays inside the processed mark and does not diffuse. In the present mode, as described above, the gas or plasma staying inside the processed mark in the object to be processed is irradiated with the second process light that includes light-absorbing wavelengths for the plasma or gas. As a result, the plasma or gas absorbs the optical energy of the second process light, and the processed mark is expanded and a crack is caused towards the surface of the object to be processed. When the processed mark or the crack expands close to the surface of the object to be processed, the internal pressure inside processed mark is released and the materials of the object to be processed near the surface explode and disperse. Accordingly, large-volume processing is achieved.

Mode S

A method of producing an optically-processed product by processing an object to be processed using a plurality of process lights. The method includes a step of emitting a first process light to a focal point set inside an object to be processed, using a first light-emitting unit, and a step of emitting a second process light during a period in which plasma or gas is generated inside the object to be processed by the first process light, using a second light-emitting unit. According to this configuration, large-volume processing is achieved with a small amount of energy, and thus optically-processed products can be produced with a smaller amount of energy.

What is claimed is:

1. An optical processing apparatus, comprising:
    a first light-emitter to emit a first process light to a focal point set inside an object to be processed; and
    a second light-emitter to emit a second process light with a light-absorbing wavelength for plasma or gas generated inside the object to be processed, by the first process light,
    wherein the second process light has a shape of beam different from a shape of beam of the first process light inside the object to be processed.

2. The optical processing apparatus according to claim 1, wherein the second light-emitter starts irradiating the gas or the plasma with the second process light after the first process light has started irradiation and before or during a period of time in which the plasma or the gas exists inside the object to be processed due to the first process light.

3. The optical processing apparatus according to claim 2, wherein the second light-emitter starts emitting the second process light within a range of 20 picoseconds later to 2000 picoseconds later after the first process light is emitted.

4. The optical processing apparatus according to claim 1, wherein the second light-emitter stops emitting the second process light after or during a period of time in which the plasma or the gas exists inside the object to be processed due to the first process light.

5. The optical processing apparatus according to claim 1, wherein the second light-emitter emits the second process light during a period of time in which the object to be processed is not irradiated with the first process light.

6. The optical processing apparatus according to claim 1, wherein the second process light has a wavelength longer than a wavelength of the first process light.

7. The optical processing apparatus according to claim 1, wherein the second process light has a wavelength $\lambda$, in which absorption coefficient $\alpha_{IB}$ that satisfies an equation $$\alpha_{IB}=1.37\times10^{-35}\lambda^3 n_e^2 T_e^{-1/2}$$

is equal to or greater than 20 cm$^{-1}$, where $n_e$ denotes electron density and $T_e$ denotes electron temperature.

8. The optical processing apparatus according to claim 1, wherein the second process light has a wavelength equal to or longer than 700 nanometers.

9. The optical processing apparatus according to claim 1, further comprising
    a laser beam source to emit a pulsed laser beam having a prescribed pulse width,
    wherein the first light-emitter irradiates the object to be processed with some of the pulsed laser beam output from the laser beam source as the first process light, and
    wherein the second light-emitter irradiates the object to be processed with remaining ones of the pulsed laser beam output from the laser beam source as the second process light, in a delayed manner.

10. The optical processing apparatus according to claim 9, wherein the first light-emitter and the second light-emitter irradiate the object to be processed with each of the first process light and the second process light, using a same light-concentrating unit in common.

11. The optical processing apparatus according to claim 1, wherein the second light-emitter emits the second process light to a focal point set inside the object to be processed.

12. The optical processing apparatus according to claim 1, wherein the second process light has a depth of focus equal to or smaller than 200 micrometers.

13. The optical processing apparatus according to claim 1, wherein at least one of the first process light and the second process light is a pulsed laser beam having a pulse width equal to or smaller than 20 picoseconds.

14. The optical processing apparatus according to claim 1, wherein the second process light has a circular shape of beam inside the object to be processed.

15. The optical processing apparatus according to claim 1, further comprising a beam-shape changer to change a shape of beam of the second process light.

16. The optical processing apparatus according to claim 15,
    wherein the beam-shape changer chronologically changes the shape of beam of the second process light with a prescribed frequency.

17. A method of processing light, the method comprising:
    emitting a first process light to a focal point set inside an object to be processed, using a first light-emitter; and
    emitting a second process light during a period of time in which plasma or gas is generated inside the object to be processed, by the first process light, using a second light-emitter,
    wherein the second process light has a shape of beam different from a shape of beam of the first process light inside the object to be processed.

18. A method of producing an optically-processed product, the method comprising:
    emitting a first process light to a focal point set inside an object to be processed, using a first light-emitter; and
    emitting a second process light during a period in which plasma or gas is generated inside the object to be processed by the first process light, using a second light-emitter,
    wherein the second process light has a shape of beam different from a shape of beam of the first process light inside the object to be processed.

19. An optical processing apparatus, comprising:
    a first light-emitter to emit a first process light to a focal point set inside an object to be processed; and a second light-emitter to emit a second process light with a light-absorbing wavelength for plasma or gas generated inside the object to be processed, by the first process light, and a beam-shape changer to change a shape of beam of the second process light.

* * * * *